July 14, 1959
E. L. HOWARD
2,894,784
WINDOW UNIT FOR MOTOR VEHICLE
Filed May 22, 1956
2 Sheets-Sheet 2
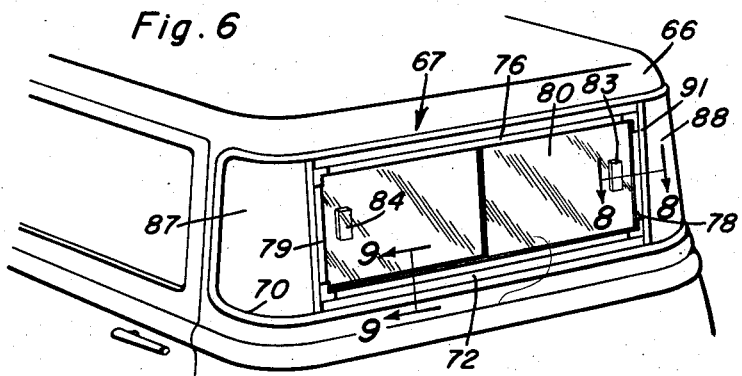
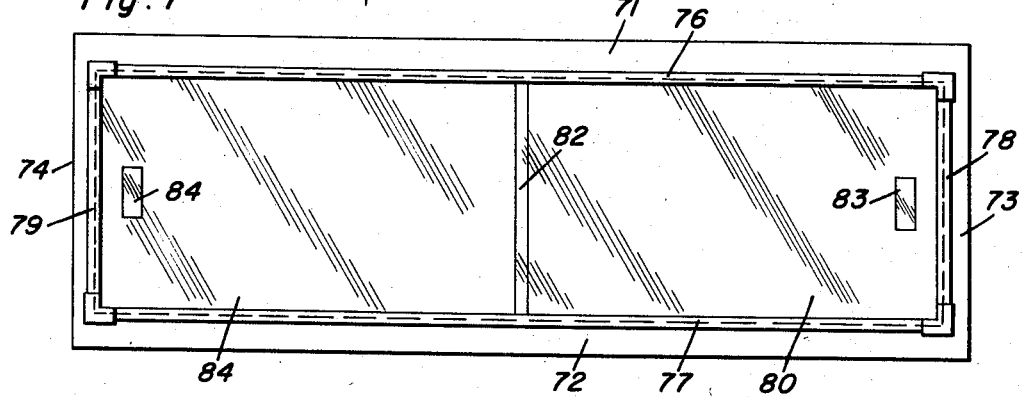
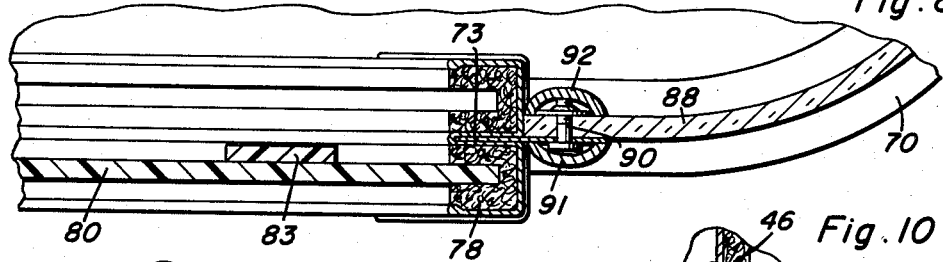
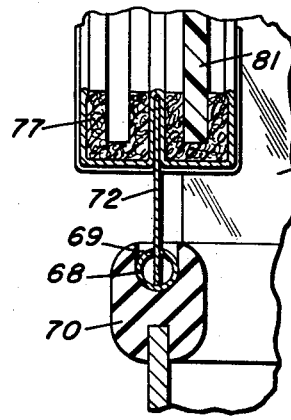
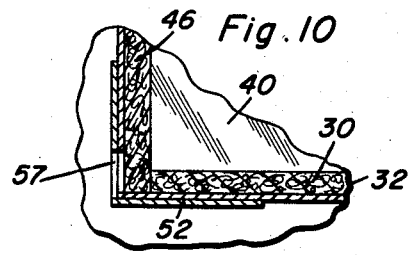
Eugene L. Howard
INVENTOR.
BY

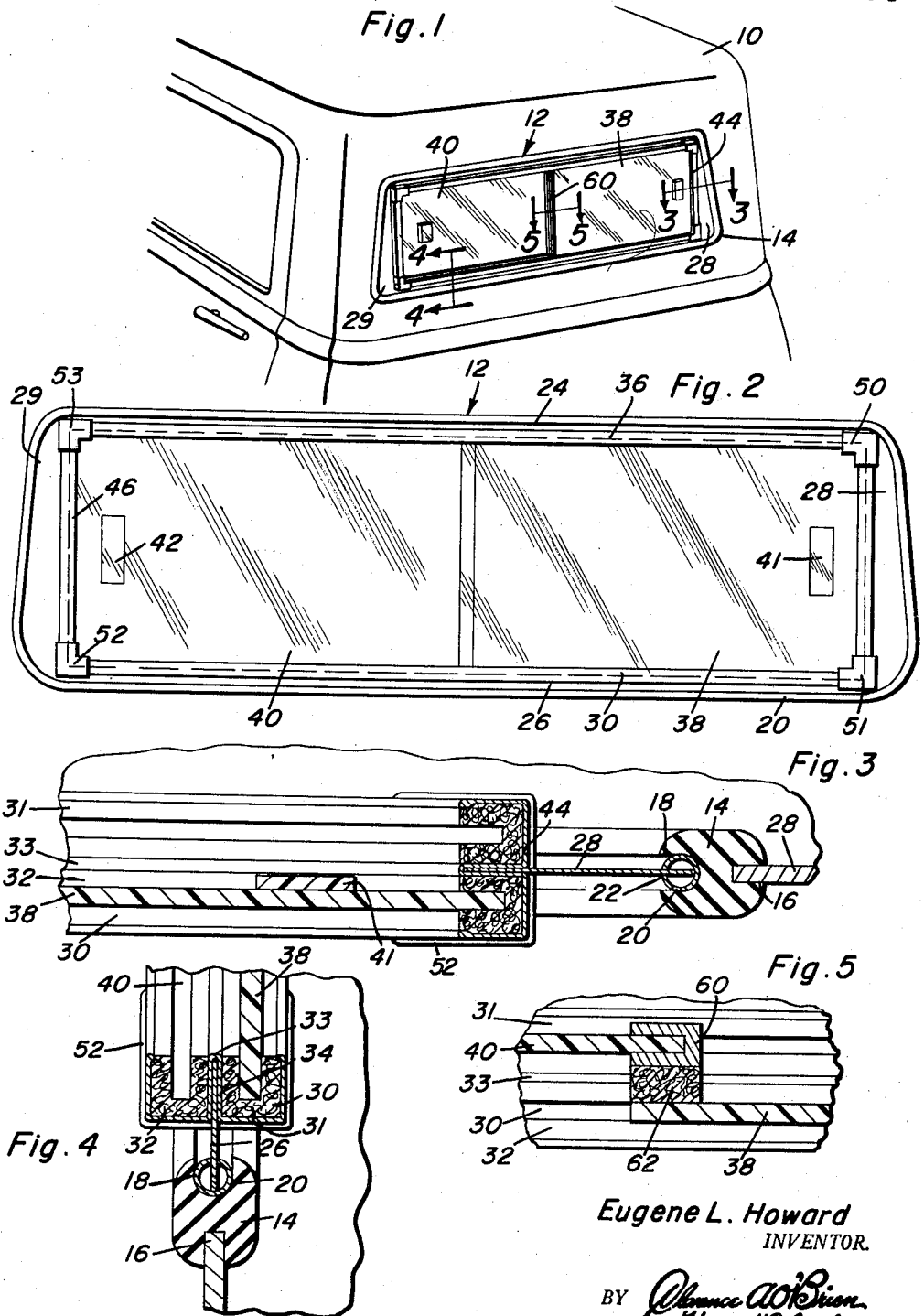

United States Patent Office

2,894,784
Patented July 14, 1959

2,894,784

WINDOW UNIT FOR MOTOR VEHICLE

Eugene L. Howard, Oklahoma City, Okla., assignor of one-half to Walter C. Miller, Oklahoma City, Okla.

Application May 22, 1956, Serial No. 586,461

3 Claims. (Cl. 296—47)

This invention relates to improvements in windows and particularly to a replacement unit for the stationary window of a motor vehicle.

An object of the present invention is to provide a window unit adapted to be installed in the rear window compartment of truck cabs principally, although the unit or one designed in accordance with the principles of the invention may be applied to other motor vehicle window openings, whereby the previously stationary window is removed in favor of a window which is capable of opening and closing in accordance with the desires of the motorist.

A further object of the invention is to provide a practical and attractive replacement window unit which is easily installed in the standard window opening of a motor vehicle, the window unit having provision for accommodating the entire window opening area and in instances where desirable the window unit having transparent wings for the purpose of aiding visibility.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a typical motor vehicle having a window unit therein which has been constructed in accordance with the invention;

Figure 2 is an elevational view of the window unit of Figure 1 shown separated from the motor vehicle;

Figure 3 is an enlarged sectional view taken on the line 3—3 of Figure 1;

Figure 4 is an enlarged sectional view taken on the line 4—4 of Figure 1;

Figure 5 is an enlarged sectional view taken on the line 5—5 of Figure 1;

Figure 6 is a fragmentary perspective view of a motor vehicle having a window unit therein which is modified from that of Figure 1;

Figure 7 is an elevational view of a part of the window unit of Figure 6;

Figure 8 is an enlarged sectional view taken on the line 8—8 of Figure 6;

Figure 9 is an enlarged sectional view taken on the line 9—9 of Figure 6; and

Figure 10 is an enlarged sectional view of one of the corners of the window unit showing particularly the water drain holes to spill rain water to the exterior of the motor vehicle.

Attention is first invited to Figures 1–5 inclusive wherein there is a standard motor vehicle 10 which is the subject on which the invention is applied. In some motor vehicles, for example the cabs of trucks, certain buses and even some of the less expensive station wagons that are presently available have stationary windows in them. By and large these stationary windows are either considered acceptable or suffered as such. In many instances the motorist desires to have a window that is capable of opening not only for ventilation but also for access. With this in view the replacement window unit 12 is provided for fitting in the window opening of the motor vehicle 10. In doing this the original rubber weather seal 14 is used. The original window pane is removed and in its place the replacement window unit 12 is installed by the use of weather seal 14, the latter having an outside groove 16 within which a part of the metal body surrounding the window opening is fitted. This weather seal is provided with an inside groove 18 which formerly accommodated the edges of the window pane. In its place an exterior tubular frame 20 shaped to conform to the window opening, is frictionally fitted. This tube is split as at 22 throughout its inner periphery in order to accommodate upper and lower spacers 24 and 26 together with lateral wings 28 and 29 respectively. The spacers and wings are made of flat material, for example sheet metal, and their edges are fitted in the slit 22. The spacers and wings may be made of one piece or separate pieces in order to facilitate assembly. Wings 28 and 29 are used so that the window unit 12 more easily and therefore more economically, fills the entire original window opening, these openings often being trapezoidal as shown in Figure 1 rather than rectangular.

There is a lower double channel 30 which opens upwardly this double channel including felt lined channels 31 and 32 that are jointed together at the upper edge 33 of their adjacent side walls. This forms a pocket 34 between the channels within which spacer 26 is fitted in order to assemble the spacer with the channels and hold them in place in frame 20. A similar, upper double channel 36 opens toward channel 30. These channels support window panes 38 and 40 for sliding, overlapping movement with respect to each other. Hand grips 41 and 42 are cemented or otherwise attached to the window panes 38 and 40 to facilitate operation thereof. A pair of vertical side double channels 44 and 46 respectively are connected to the ends of the upper and lower double channels and form seats within which to accommodate the vertical edges of the panes 38 and 40. This forms a tight weather seal for the window panes. Right angular molding clips 50, 51, 52 and 53 respectively are at the corners of the four channels in order to help to keep the channels assembled and to provide a finished appearance. The clips (Figure 10) 52 and 51 are provided with drain holes 57 for moisture, as is the lower part of the vertical double channels that are embraced by clips 51 and 52.

A division bar channel 60 is secured to the inner edge of pane 40 and has a mohair or felt pad 62 that is swept on pane 38 upon opening and closing movement of either of the window panes. This division bar channel is attached by cementing or by other standard techniques.

In assembling the window unit 12 weather seal 14 from the original window installation is used. It accommodates the split tube 20, while the latter accommodates the wings 28 and 29 together with upper and lower spacers 24 and 26. Although the spacers and wings may be made of sheet metal, they may also be made of a transparent material such as a strong plastic, for example "Plexiglas." Inasmuch as the spacers and wings are firmly fitted in the pocket between channels of the upper and lower as well as side double channels, a very rigid structure results. After installation the motorist has a window unit that is provided with panes capable of opening and closing in accordance with his desires.

Attention is invited now principally to Figures 6–10 wherein there is a different manufacturer's make of motor vehicle. This vehicle has a "wrap-around" stationary window in its original manufacture. Figure 6 illustrates the motor vehicle with this window replaced by replacement window unit 67 consisting of a tubular frame 68 that has a split as at 69 on its inner periphery and that is shaped the same as the original, replaced stationary window pane. Original weather seal 70 is used for attaching the replacement unit 67 in the window opening in the manner similar to the use of weather seal 14 of Figure 1.

Unit 67 has upper and lower spacers 71 and 72 respectively together with side spacers 73 and 74, each spacer being made of flat material capable of fitting in the outwardly opening pockets between parts of the upper and lower double channels 76 and 77 and also the side double channels 78 and 79 respectively. These double channels accommodate sliding window panes 80 and 81 the latter being adapted to overlap when opened as described in connection with window unit 12. They have a division bar channel 82 between them and hand grips 83 and 84 as described in connection with window unit 12. The corner clips at the junctions of the upper and lower and side double channels are the same, including drain holes 57, as the corner clips 50, 51, 52 and 53.

Upper and lower spacers 71 and 72 are adapted to fit directly in the slit 69 in the upper and lower parts of the frame 68. Side spacers 73 and 74 have transparent wings 87 and 88 secured to them by suitable means, as screws 90 which are concealed by molding strips 91 and 92 which extend into groove 68 of the weather seal at their upper and lower ends. The upper, lower and outer edges of the wings 87 and 88 may fit either directly into the groove 88 of weather seal 70 by foreshortening the frame by this amount or may fit into the slit 69, the latter being enlarged a sufficient amount to accommodate these edges of the two wings.

In assembling this window unit, essentially the same procedure is followed as described in connection with window unit 12. In both cases an attractive and relatively easily mounted window unit is provided for the motor vehicle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use on a motor vehicle that has a stationary window provided with a weather seal around the edges thereof, a replacement window unit for said stationary window, said replacement window unit comprising upper and lower double run channels, side channels, clips connecting said double run channels to said side channels, said clips and said channels having aligned drain holes, spacers secured to said channels and protruding laterally therefrom, a frame fitted in at least a part of said weather seal and connected to said spacers in order to support said channels, and window panes slidably mounted in said channels.

2. The replacement window unit of claim 1 wherein there are transparent wings secured to the spacers on the side channels.

3. The replacement window unit of claim 1 wherein said spacers are fitted between the runs of said double run upper and lower channels.

References Cited in the file of this patent

UNITED STATES PATENTS

| | | |
|---|---|---|
| 1,619,501 | Evans | Mar. 1, 1927 |
| 2,677,154 | Agle | May 4, 1954 |
| 2,701,162 | Kliger | Feb. 1, 1955 |
| 2,729,500 | Dickensheid | Jan. 3, 1956 |
| 2,770,487 | Isbell | Nov. 13, 1956 |
| 2,805,097 | Barber | Sept. 3, 1957 |

FOREIGN PATENTS

| | | |
|---|---|---|
| 609,665 | Great Britain | Oct. 5, 1948 |